(12) United States Patent
Rinne et al.

(10) Patent No.: US 8,948,072 B2
(45) Date of Patent: Feb. 3, 2015

(54) METHOD FOR PROVIDING A PLURALITY OF SERVICES

(75) Inventors: Mikko Juhana Rinne, Espoo (FI); Tommi Tapani Kovisto, Espoo (FI); Henri Markus Koskinen, Espoo (FI); Tuomas Tapio Hakuli, Oulu (FI)

(73) Assignee: Nokia Corporation, Espoo (FI)

( * ) Notice: Subject to any disclaimer, the term of this patent is extended or adjusted under 35 U.S.C. 154(b) by 1075 days.

(21) Appl. No.: 12/665,666

(22) PCT Filed: Jun. 17, 2008

(86) PCT No.: PCT/EP2008/057638
§ 371 (c)(1),
(2), (4) Date: Nov. 9, 2010

(87) PCT Pub. No.: WO2008/155332
PCT Pub. Date: Dec. 24, 2008

(65) Prior Publication Data
US 2011/0044225 A1    Feb. 24, 2011

(30) Foreign Application Priority Data
Jun. 18, 2007   (GB) .................................. 0711833.4

(51) Int. Cl.
*H04W 4/00* (2009.01)
*H04H 20/71* (2008.01)
(Continued)

(52) U.S. Cl.
CPC ......... *H04W 72/005* (2013.01); *H04N 21/6131* (2013.01); *H04L 12/189* (2013.01); *H04N 21/23655* (2013.01)

USPC ........... 370/312; 370/210; 370/235; 370/252; 370/328; 370/336; 370/345; 370/352; 455/422.1; 455/442; 455/456.3

(58) Field of Classification Search
CPC ... H04W 72/005; H04W 36/18; H04W 48/20; H04W 28/22; H04L 12/1868; H04L 45/16; H04L 5/006; H04L 12/189; H04N 21/6131
USPC .................................................. 370/256–463
See application file for complete search history.

(56) References Cited

U.S. PATENT DOCUMENTS 5,541,917 A * 7/1996 Farris ............................ 370/352
5,677,905 A * 10/1997 Bigham et al. ........... 370/395.21

(Continued)

FOREIGN PATENT DOCUMENTS

CN     1490960 A    4/2004
CN     1550072 A    11/2004

(Continued)

OTHER PUBLICATIONS

International Search Report and Written Opinion received in corresponding Patent Cooperation Treaty Application No. PCT/EP2008/057638, Jan. 27, 2009, 12 pages.

(Continued)

*Primary Examiner* — Venkatesh Haliyur
(74) *Attorney, Agent, or Firm* — Harrington & Smith

(57) ABSTRACT

A method comprising providing a plurality of services to be transmitted over a common area by a plurality of nodes; and providing information relating to a quantity of data of said plurality of services for all of said services to said plurality of nodes.

25 Claims, 12 Drawing Sheets

(51) Int. Cl.
*H04L 12/66* (2006.01)
*H04W 40/04* (2009.01)
*H04W 72/00* (2009.01)
*H04N 21/61* (2011.01)
*H04L 12/18* (2006.01)
*H04N 21/2365* (2011.01)

(56) References Cited

U.S. PATENT DOCUMENTS

| | | | | |
|---|---|---|---|---|
| 6,754,181 | B1* | 6/2004 | Elliott et al. | 370/252 |
| 6,909,708 | B1* | 6/2005 | Krishnaswamy et al. | 370/352 |
| 7,145,898 | B1* | 12/2006 | Elliott | 370/352 |
| 7,283,815 | B2* | 10/2007 | Kim et al. | 455/423 |
| 7,301,927 | B2* | 11/2007 | Lee et al. | 370/338 |
| 7,321,589 | B2* | 1/2008 | Lohr et al. | 370/394 |
| 7,346,352 | B2* | 3/2008 | Colban et al. | 455/442 |
| 7,362,726 | B2* | 4/2008 | Petrovic et al. | 370/329 |
| 7,457,275 | B2* | 11/2008 | Zhao | 370/342 |
| 7,532,887 | B2* | 5/2009 | Kyung et al. | 455/439 |
| 7,620,061 | B2* | 11/2009 | Yi et al. | 370/432 |
| 7,623,483 | B2* | 11/2009 | Yi et al. | 370/328 |
| 7,626,975 | B2* | 12/2009 | Colban et al. | 370/350 |
| 7,643,461 | B2* | 1/2010 | Choi et al. | 370/341 |
| 7,852,795 | B2* | 12/2010 | Cai | 370/312 |
| 7,864,731 | B2* | 1/2011 | Forsberg | 370/331 |
| 7,885,235 | B2* | 2/2011 | Mochizuki et al. | 370/331 |
| 8,068,465 | B2* | 11/2011 | Zhang et al. | 370/335 |
| 8,077,612 | B2* | 12/2011 | Rinne et al. | 370/230 |
| 8,130,687 | B2* | 3/2012 | Cai et al. | 370/312 |
| 8,135,420 | B2* | 3/2012 | Lee et al. | 455/458 |
| 8,149,749 | B2* | 4/2012 | Maeda et al. | 370/311 |
| 8,160,025 | B2* | 4/2012 | Lee et al. | 370/331 |
| 8,218,559 | B2* | 7/2012 | Vare et al. | 370/412 |
| 8,243,665 | B2* | 8/2012 | Lee et al. | 370/329 |
| 8,310,972 | B2* | 11/2012 | Watanabe et al. | 370/312 |
| RE43,949 | E* | 1/2013 | Park et al. | 455/452.2 |
| 8,396,020 | B2* | 3/2013 | Lee et al. | 370/312 |
| 8,411,552 | B2* | 4/2013 | Kim et al. | 370/208 |
| 8,472,377 | B2* | 6/2013 | Becker et al. | 370/328 |
| 8,477,673 | B2* | 7/2013 | Casaccia et al. | 370/312 |
| 8,493,915 | B2* | 7/2013 | Chen et al. | 370/328 |
| 8,509,240 | B2* | 8/2013 | Wang et al. | 370/394 |
| 8,549,287 | B2* | 10/2013 | Sarkkinen et al. | 713/163 |
| 8,660,046 | B2* | 2/2014 | Maeda et al. | 370/312 |
| 2003/0189914 | A1* | 10/2003 | Zhao | 370/342 |
| 2004/0008657 | A1 | 1/2004 | Lee et al. | 370/342 |
| 2005/0129042 | A1 | 6/2005 | Muhonen et al. | |
| 2005/0147040 | A1* | 7/2005 | Vayanos et al. | 370/235 |
| 2005/0169205 | A1* | 8/2005 | Grilli et al. | 370/313 |
| 2005/0233760 | A1* | 10/2005 | Voltolina et al. | 455/503 |
| 2006/0171369 | A1 | 8/2006 | Ostrup et al. | |
| 2006/0182065 | A1* | 8/2006 | Petrovic et al. | 370/332 |
| 2006/0211436 | A1* | 9/2006 | Paila et al. | 455/509 |
| 2007/0047452 | A1* | 3/2007 | Lohr et al. | 370/242 |
| 2007/0064608 | A1* | 3/2007 | Rinne et al. | 370/230 |
| 2007/0076667 | A1* | 4/2007 | Kashima et al. | 370/335 |
| 2007/0183388 | A1* | 8/2007 | Breuer et al. | 370/345 |
| 2008/0025240 | A1* | 1/2008 | Casaccia et al. | 370/312 |
| 2008/0031245 | A1* | 2/2008 | Pekonen | 370/390 |
| 2008/0076359 | A1* | 3/2008 | Charpentier et al. | 455/63.1 |
| 2008/0084837 | A1* | 4/2008 | Watanabe et al. | 370/312 |
| 2008/0085701 | A1* | 4/2008 | Darwood et al. | 455/422.1 |
| 2008/0101326 | A1* | 5/2008 | Zhang et al. | 370/345 |
| 2008/0186976 | A1* | 8/2008 | Axnas et al. | 370/395.4 |
| 2008/0261581 | A1* | 10/2008 | Cai | 455/422.1 |
| 2008/0268854 | A1* | 10/2008 | Cai et al. | 455/444 |
| 2008/0285579 | A1* | 11/2008 | Vare et al. | 370/412 |
| 2008/0304404 | A1* | 12/2008 | Lu et al. | 370/210 |
| 2009/0175183 | A1* | 7/2009 | Mochizuki et al. | 370/252 |
| 2010/0046409 | A1* | 2/2010 | Lohmar et al. | 370/312 |
| 2010/0061285 | A1* | 3/2010 | Maeda et al. | 370/312 |
| 2010/0142492 | A1* | 6/2010 | Huschke et al. | 370/336 |
| 2010/0167746 | A1* | 7/2010 | Lee et al. | 455/450 |
| 2010/0195558 | A1* | 8/2010 | Koskinen | 370/312 |
| 2010/0265867 | A1* | 10/2010 | Becker et al. | 370/312 |
| 2011/0026464 | A1* | 2/2011 | Chen et al. | 370/328 |
| 2011/0044225 | A1* | 2/2011 | Rinne et al. | 370/312 |
| 2011/0128903 | A1* | 6/2011 | Futaki et al. | 370/312 |
| 2012/0182921 | A1* | 7/2012 | Tsuboi et al. | 370/312 |
| 2012/0213142 | A1* | 8/2012 | Van Lieshout et al. | 370/312 |
| 2012/0236776 | A1* | 9/2012 | Zhang et al. | 370/312 |
| 2012/0250553 | A1* | 10/2012 | Huschke et al. | 370/252 |
| 2012/0263089 | A1* | 10/2012 | Gupta et al. | 370/312 |
| 2013/0028118 | A1* | 1/2013 | Cherian et al. | 370/252 |
| 2013/0035115 | A1* | 2/2013 | Lindegren et al. | 455/456.3 |
| 2013/0094428 | A1* | 4/2013 | Lee | 370/312 |
| 2013/0188546 | A1* | 7/2013 | Turtinen et al. | 370/312 |
| 2013/0229970 | A1* | 9/2013 | Futaki et al. | 370/312 |

FOREIGN PATENT DOCUMENTS

| | | |
|---|---|---|
| CN | 1585508 A | 2/2005 |
| CN | 1960202 A | 5/2007 |
| EP | 1387591 A | 2/2004 |
| WO | WO 2004064301 A2 * | 7/2004 |

OTHER PUBLICATIONS

Alcatel-Lucent, "Details of eMBMS Content Synchronization", 3GPP TSG-RAN WG3 #55, R3-070220, St. Louis, USA, Feb. 12-16, 2007, 8 pages.

Nokia Siemens Networks, "Analysis of Distributed and Centralised L2 Functionalities for MBMS in LTE", 3GPP TSG-RAN3 #55, R3-070588, St. Julian, Malta, Mar. 27-30, 2007, 7 pages.

NTT DoCoMo, et al., "Text Proposal for MBMS Content Synchronization", 3GPP TSG-RAN3 #55, R3-070708, St. Julian, Malta, Mar. 27-30, 2007, 2 pages.

3GPP TS 22.246 V8.3.0 "Multimedia Broadcast/Multicast Service (MBMS) User Services", Release 8, Mar. 2007, 17 pages.

European Search Report received for corresponding EP Application No. 12165733.2, dated Jul. 31, 2012, 8 pages.

Nokia Siemens Networks et al.; "Support of a Lightweight E-MBMS deployment in the General E-MBMS Architecture", 3GPP Draft: R3-017016 LW M, 3rd Generation Partnership Project, Mobile Competence Centre; vol. Ran WG3, No. Kobe, Japan, May 3, 2007.

Ericsson, "SFN Resource Allocation for E-MBMS", 3GPP Draft; R3-061504, 3rd Generation Partnership Project, Mobile Mobile Competence Centre; vol. Ran WG3, No. Seoul, Korea, Oct. 5, 2006.

"L2 MBMS Content Synchronization", 3GPP Draft; R2-071397, 3rd Generation Partnership Project, Mobile Competence Centre; vol. Ran WG2, No. St. Julian, Mar. 22, 2007.

Lucent Technologies, "MBMS Requirements", 3GPP Draft; R3-061808, 3rd Generation Partnership Project, Mobile Competence Centre; vol. Ran WG3, No. Riga, Latvia, Nov. 1, 2006.

Office Action received for corresponding CA Application No. 2,691,154, dated Jul. 31, 2012, 3 pages.

Office Action received for corresponding CN Application No. 200880101188.1, dated Aug. 3, 2012, 11 pages.

3GPP TS 36.300 V9.1.0; "3rd Generation Partnership Project; Technical Specification Group Radio Access Network; Evolved Universal Terrestrial Radio Access (E-UTRA); and Evolved Universal Terrestrial Radio Access Network (EUTRAN); Overall description; Stage 2 (Release 9)"; Sep. 2009; whole document (165 pages).

3GPP TS 36.443 V9.1.0; "3rd Generation Partnership Project; Technical Specification Group Radio Access Network; Evolved Universal Terrestrial Radio Access Network (E-UTRAN); M2 Application Protocol (M2AP) (Release 9)"; Mar. 2010; whole document (78 pages).

3GPP TS 25.446 V9.2.0; "3rd Generation Partnership Project; Technical Specification Group Radio Access Network; MBMS synchronisation protocol (SYNC) (Release 9)"; Jun. 2010; whole document (22 pages).

QAULCOMM Europe; "Principles for resource allocation among SFN areas"; 3GPP TSG-RAN WG3 #55bis, R3-070558; Mar. 27-30, 2007; whole document (10 pages); St. Julians, Malta.

Nokia Corporation et al.; "Distributed Operation"; Patent application No. GB 0705547.8, filed Mar. 23, 2007; whole document (9 pages).

(56) References Cited

OTHER PUBLICATIONS

Office Action received for corresponding Chinese Application No. 200880101188.1, dated May 6, 2013, 05 pages of Office Action and 3 pages of Office Action translation.
Office Action received for corresponding Australian Patent Application No. 2008265175, dated Feb. 15, 2011, 2 pages.
Office Action received for corresponding EP Patent Application No. 08761123.2, dated Nov. 18, 2011, 3 pages.
Nokia Siemens Networks et al.; "Support of a Lightweight E-MBMS deployment in the general E-MBMS Architecture"; 3GPP TSG RAN WG3 Meeting #56, R3-071016; May 7-11, 2007; Kobe, Japan; whole document (5 pages).
Ericsson; "SFN resource allocation for E-MBMS"; 3GPP TSG-RAN WG3 Meeting #53bis, R3-061504; Oct. 10-13, 2006; Seoul, Korea; whole document (3 pages).

\* cited by examiner

METHOD FOR PROVIDING A PLURALITY OF SERVICES

RELATED APPLICATION

This application was originally filed as PCT Application No. PCT/EP2008/057638 filed Jun. 17, 2008, which claims priority to GB Application No. 0711833.4 filed Jun. 18, 2007.

FIELD OF THE INVENTION

The present invention relates to a method for providing a plurality of services to be transmitted over a common area.

BACKGROUND OF THE INVENTION

Long-Term Evolution (LTE—this is evolution of UTRAN UMTS (Universal Mobile Telecommunication System) Terrestrial Radio Access Network) Multimedia Broadcast/Multicast Service MBMS (as defined in 3GPP—3$^{rd}$ Generation Partnership Project) is planned to support Multimedia Broadcast Single-Frequency Network (MBSFN) operation, in which macro diversity gain is accomplished by transmitting exactly the same signals from all base stations (eNB—evolved Node B (LTE base station) belonging to an MBSFN Area.

An MBSFN Area may be defined as a set of cells transmitting synchronised data of the same MBMS service. For multicell reception to work properly in a terminal (UE) receiving the signal from an MBSFN, the same bits should be transmitted from all the eNBs belonging to the MBSFN within a time period defined by a cyclic prefix (CP) of the OFDM (Orthogonal Frequency Division Multiplexing) signal, signal propagation and inter-site distance.

During proper operation the signals from different participating cells combine in the terminal receiver in the same way as if they were multipath components originating from the same transmitter. If different bits are sent from different eNBs, the signals may interfere destructively. An eNB may transmit content from multiple MBSFNs and/or cell-specific content. MBMS can be provided either on a dedicated MBMS frequency layer or a mixed layer, where unicast transmission (including single-cell MBMS content) can be time-multiplexed with MBSFN transmission on the same frequency layer.

In 3GPP TS 22.246, "Multimedia Broadcast/Multicast Service (MBMS) user services; Stage 1(Release 8)", v. 8.3.0, March 2007 the requirement for channel change of MBMS-based TV service is given as follows:

The MBMS service shall add no more than 1 second when switching between different TV streams to any delay introduced with regards to the coding of the TV stream.

It shall be possible for an operator to configure the MBMS Television service so that the typical switching time, from the end user's perspective, does not exceed 2 seconds.

The data rate of an encoded video signal may be variable. H.264 (as defined by ITU International Telecommunication Union) is currently the only specified codec for WCDMA (Wideband Code Division Multiple Access) MBMS video streaming (including television) services. Even though content-based differences (amount of motion in video picture) mostly do not produce data rate variations after encoding, due to the somewhat unpredictable need to include "full picture" frames (also known as I-frames) there can be significant variations in the data rate of an encoded video signal. An example of this data rate variation is shown in FIG. 1. Even though the stream was generated using a "Constant Bitrate" encoder setting, the maximum data rate was 403 kbps, while average was 322 kbps.

FIG. 1 shows a graph of data rate on the y axis against 1 second time intervals on the x axis. As can be seen, the data rate for each 1 second interval varies from interval to interval—that is the amount of data transmitted in a 1 second interval varies.

Due to the channel change requirement, the maximum I-frame interval (full picture required to start playback of the video stream) should be about 1 second. In order to ensure transmission of the I-frame within one second, buffering or traffic shaping of data is arranged so that the 1 second averaging period is not exceeded. In order to transmit the data shown in, FIG. 1 the TV service can either be served by a variable bitrate connection, or transmission resources of about 25% above average level can be reserved, resulting in significant wasting of radio resources. As the data rates of different TV channels are normally uncorrelated, multiplexing of multiple MBMS services tends to stabilize the aggregate data rate.

Full E (evolved)-MBMS architecture, as currently discussed in RAN WG3 (Radio Access Network Working Group 3), is shown in FIG. 2. As schematically shown in FIG. 2, there are three domains: the application domain 2, the EPC (Evolved packet core) domain 4 and the E-UTRAN (Evolved UTRAN) domain 6. The application domain comprises a BM-SC 8 Broadcast Multicast Service Centre responsible for the delivery of MBMS services. The BM-SC is a source of MBMS content such as TV transmissions. It can be used with various different radio access technologies, at the same time. The EPC domain comprises a MBMS gateway GW 10. The E-UTRAN domain 6 comprises an IP (Internet Protocol) multicast functionality 12, a coordinating control-plane node MBMS Control Entity (MCE) 14 and a plurality of eNBs 16.

The BM-SC 8 is arranged to communicate with the MBMS GW 10. The MBMS GW 10 is arranged to be connected to the IP Multicast functionality and to the MCE 14. The MCE 14 is connected to at least some eNBs 16 but not necessarily all of the eNBs 16. The MCE 14 will be connected to the eNBs in the defined MBSFN area. The MCE 14 is also arranged to be connected to the IP multicast functionality 12. The IP multicast functionality 12 is connected to the eNBs 16.

The BM-SC 8 provides user-plane broadcast data to the MBMS GW 10 which in turn provides signals to the IP multicast functionality 12. The IP multicast functionality 12 provides signals to the eNBs 16 and the MCE 14. The MCE 14 provides signals to the MBMS gateway 10. The MCE 14 is arranged to have the function of allocation of the radio resources used by all eNBs in the MBSFN area for multi-cell MBMS transmissions using MBSFN operation.

Reference is made to FIG. 3 which shows the so called "Lightweight MBMS deployment", where the MCE as a separate node is omitted. This is to provide a simplified architecture compared to the arrangement of FIG. 2. As can be seen from a comparison between FIGS. 2 and 3, the architectures look similar apart from the omission of the MCE entity. One of the limitations of a lightweight deployment is that it does not support frequent allocation and re-allocation of radio resources. Therefore variable bitrates are not supported as a centralized function.

With a full E-MBMS architecture, support of bitrate variation for every scheduling period may require very frequent signalling between the MBMS GW 10 and MCE 14. The MBMS GW 10 would need to indicate for every scheduling period the offered amount of data for every MBMS service, and the MCE 14 would need to indicate allocated capacity for each MBMS service.

In order to provide an efficient use of resources, support of variable bitrate per MBMS service may be required. A centralized solution, where a centralized node would monitor the amount of offered traffic for each service, and schedule traffic accordingly, is not compatible with the lightweight deployment and not preferred for the currently agreed 3GPP architecture, which seeks maximum alignment with the distributed architecture used in unicast.

The inventors have appreciated that there is a problem to get statistical multiplexing gain, while supporting guaranteed bitrate per service in a distributed solution, maintaining content synchronization across all eNBs also in case of data loss on the M1-u interface (that is the interface between the IP multicast functionality and the eNBs in the MBSFN area) which needs to be addressed.

In DVB-H (Digital Video Broadcasting-Handheld) this problem has been addressed by multiplexing in a centralized node on a layer denoted as "MPE-FEC"—Multiprotocol Encapsulation—Forward Error Correction. Multiple TV-channels can be summed to one multiplex of MPE-FEC frames, where the aggregate data rate is averaged by the multiplexing. While this centralized solution is straightforward, it may be incompatible with the current E-UTRAN MBMS architecture.

SUMMARY OF THE INVENTION

Various aspects of the invention can be seen from the appended claims.

BRIEF DESCRIPTION OF FIGURES

For a better understanding of the present invention and as to how the same may be carried into effect, reference will now be made by way of example only to the accompanying drawings in which.

DETAILED DESCRIPTION OF PREFERRED EMBODIMENTS OF THE INVENTION

Embodiments of the invention will now be described. Embodiments of the present invention may be implemented in an environment related to UTRAN Long-Term Evolution (LTE which is also known as 3.9G or Evolved UTRAN) and provision of Multimedia Broadcast/Multicast Services (MBMS) therein.

In embodiments of the invention, participating eNBs may be provided with enough information to be able to perform the final scheduling of multiplexed services locally, while ensuring uniform operation among all the eNBs belonging to the same MBSFN.

The inventors have appreciated that the multiplexing of several MBMS services into one radio bearer in a centralized node (this radio bearer still having a fixed data rate) has problems because (1) the bitrate can be guaranteed only for the combination of services and not an individual service, resulting in the problem that if the TV channels, which are scheduled first, exceed their average data rates, there may be no capacity left for the TV channels scheduled last and (2) a TV must receive the whole multiplexed radio bearer, even if it only wants one TV channel, resulting in increased receiver activity and power consumption.

The inventors have appreciated that a content synchronization scheme for ensuring that the same data gets transmitted from all the base stations at the same time or more or less at the same time is also needed.

A basic summary of the proposals in e.g.:

3GPP Tdoc R3-070220, "Details of eMBMS Content Synchronization", source: Alcatel-Lucent;

3GPP Tdoc R3-070558, "Analysis of distributed and centralised L2 functionalities for MBMS in LTE", source: Nokia, Siemens Networks; and 3GPP Tdoc R3-070708, "Text proposal for MBMS content synchronization", source: NTT DoCoMo, IPWireless, Ericsson, Panasonic, Siemens Networks, Nokia, Alcatel-Lucent is given below and can be understood as prior art.

Figure 1:
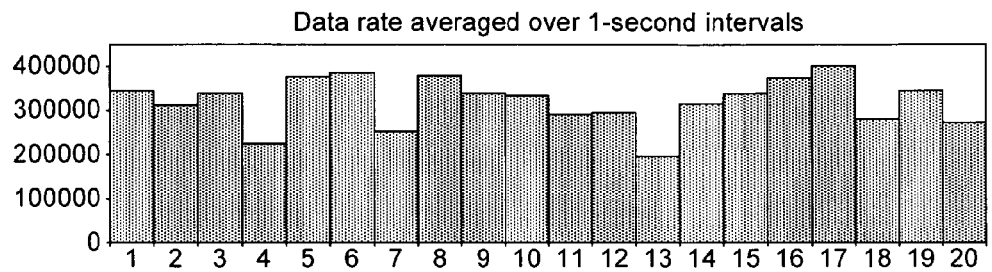
FIG. 1 shows an example of H.264 encoded video data rate averaged over 1-second intervals.
Figure 2:
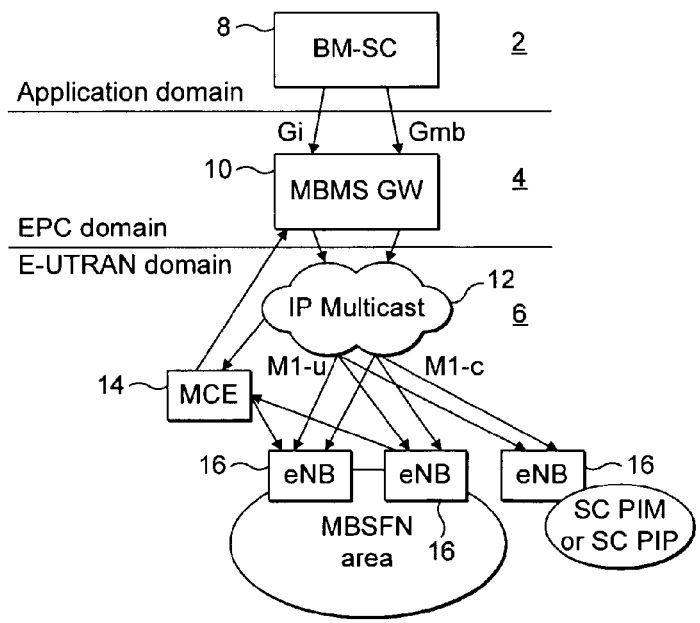
FIG. 2 schematically shows a full E-MBMS Architecture.
Figure 3:
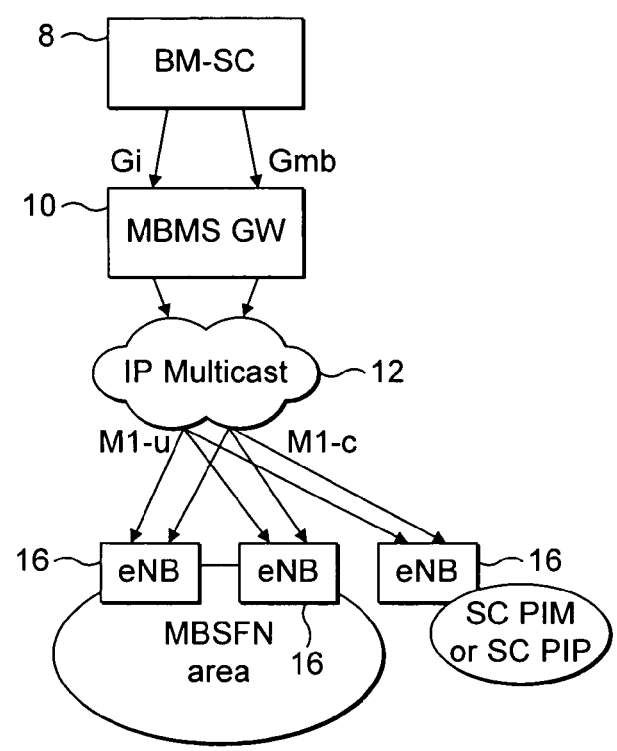
FIG. 3 schematically shows a "Lightweight" E-MBMS deployment.
Figure 4:
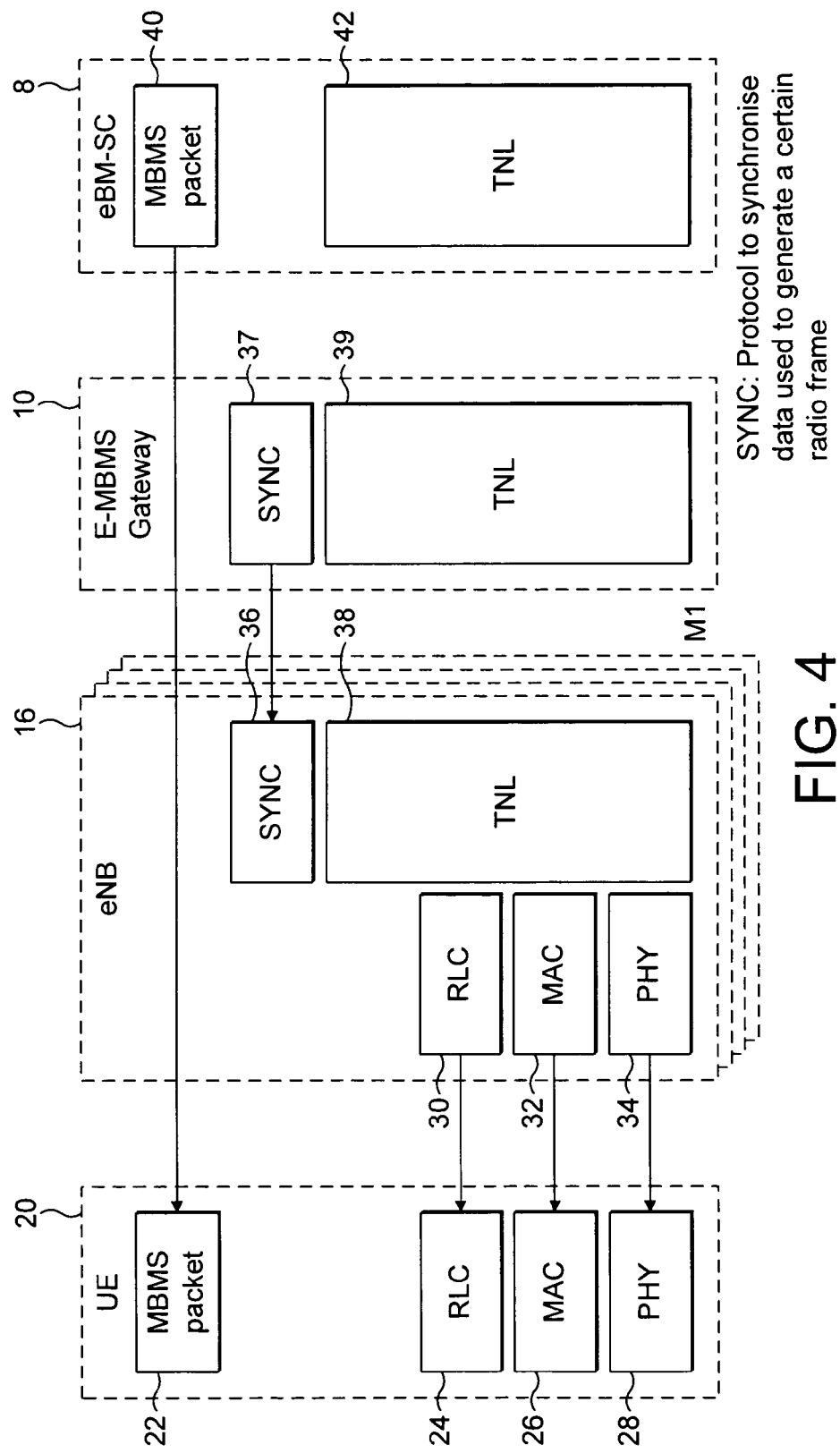
FIG. 4 shows schematically a Protocol stack indicating the termination points of the "SYNC" protocol.

FIG. 4 shows the termination points of a "SYNC" (synchronisation) protocol. The arrangement shown in FIG. 4 comprises user equipment UE 20 which is connected to eNBs 16 which are in turn connected to the MBMS GW 10 which is connected to the BM-SC 8 in a similar way to the arrangement shown in FIGS. 2 and 3. This arrangement is such that the BM-SC 8 can connect to the UE 20 via the MBMS GW 10 and the respective eNBs 16, and the eNBs 16 can connect to the MBMS gateway.

The UE comprise an application layer utilizing received MBMS packets 22, a RLC layer 24, a MAC layer 26 and a PHY (physical layer) 28. The eNB comprises a RLC layer 30, a MAC layer 32 and a PHY layer 34. The RLC layers 24 and 20, the MAC layers 26 and 32, and the PHY layers 28 and 34 are respectively arranged to communicate with the corresponding layer in the other entity. The connection between the UE and the eNB will be via a wireless connection. The eNB 16 also has a SYNC protocol 36 and TNL (transport network layer) functionality 38. The MBMS GW 10 comprises corresponding SYNC 37 protocol and TNL functionality 39. The SYNC protocol is to synchronise data used to generate a certain radio frame.

The BM-SC 8 comprises an application layer 40 transmitting MBMS packets 40 and a TNL function 42. The application layer 40 is arranged so that it communicates with the UE MBMS application layer 22.

Figure 5:
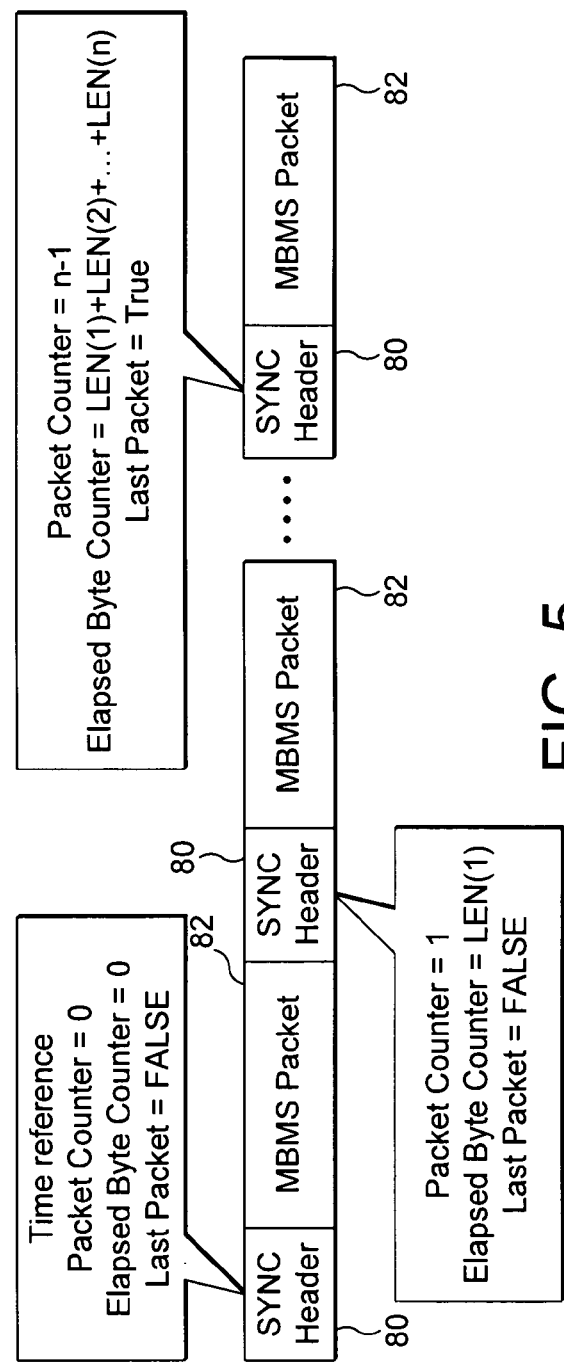
FIG. 5 shows a data burst of one MBMS service with headers.

The assumption is that the SYNC protocol in the MBMS GW 10 adds suitable information for transmission over the M1_u interface for participating eNBs to support content synchronization. The information for transmission across the M1_u interface is illustrated in FIG. 5 where a SYNC header 80 is followed by a MBMS packet 82. The requirements for the SYNC protocol can be summarized as:

1) Participating eNBs get the information they need to synchronize the transmission of the same data to the same physical layer resource.

2) An eNB must be able to recover after lost or delayed data already within a scheduling burst. Impacted transport blocks are muted, transmission resumes from the next transport block, for which the complete information is available.

Aspects of the SYNC protocol are summarized as follows:
1) Data is assumed to be transmitted in separable bursts in a periodical fashion, the time interval defining a period denoted as a scheduling period. The amount of data in a burst is that needed by an MBMS service during one scheduling period. If MBMS services are purely time-multiplexed with each other, the data bursts are sent from each active MBMS service (on the same frequency layer) after each other, and after one scheduling period, a subsequent burst of the first service would be provided.
2) The "SYNC" protocol in the gateway (GW) attaches extra information to the IP-packets of each MBMS service to facilitate content synchronisation.
3) The beginning of the burst for each service carries a timestamp (Time reference). This timestamp is understood by all participating eNBs. The timestamp also works as an implicit start-of-burst indicator so that the eNB becomes aware that a new burst is starting. If network transmission is accurate enough, the timestamp indication can also be implicit. This is included in the header 80.
4) A packet counter information element inserted to every packet header counts the number of packets—this in included in the header 80.
5) An octet counter element inserted to every packet header counts the number of elapsed octets cumulatively. In different variants this octet counter may or may not be reset for every packet burst. This is included in the header 80.
6) Header 80 of the last packet of the burst includes a special "Last packet" indicator flag.

If the segmentation and concatenation function built into the RLC/MAC protocol in eNBs follows the principle of adding exactly one length indicator element per RLC SDU (Service Data Unit), the receiving eNB can compute both the exact amount of lost data and the length of the transport blocks that would have been created, resulting in successful recovery from data loss on the M1-u interface. The impacted eNB must mute its transmission during the period when the lost data would have been transmitted. Synchronized transmission can be resumed from such a radio subframe onwards, for which complete data is available. The SYNC protocol supports the situation that if data is lost it is possible to continue transmitting from the point onwards for which content is available. The SYNC protocol means that the length of time to be skipped in known. The SYNC protocol is synchronizing the transmissions through various eNBs.

Preferred embodiments of the invention are now discussed. In some embodiments means are provided to efficiently support variable bitrate through dynamic sharing of radio resources in a distributed architecture. For this, a hybrid scheme is required:

A multicast/broadcast service multiplex is defined. The multiplex may only contain services, which are broadcast over the same MBSFN Area, i.e. are transmitted from exactly the same eNBs and cells. Dynamic sharing of radio resources is possible only within a service multiplex.

Information of each MBMS service in the multiplex, e.g. the transmission order of services within the multiplex and the priority and guaranteed bitrates of each service, is communicated to all participating eNBs.

For each service multiplex, a synchronisation protocol (SYNC) inserts elapsed octet and elapsed packet counters over the whole service multiplex. In some implementation variants described later, there may also be separate elapsed octet and elapsed packet counters over each individual MBMS service. Identifiers for linking together all the packets of a dynamic multiplex (such as a multiplex ID) and/or uniquely separating each MBMS service within the multiplex (such as MBMS Service ID) may be provided to the eNBs.

Figure 14:
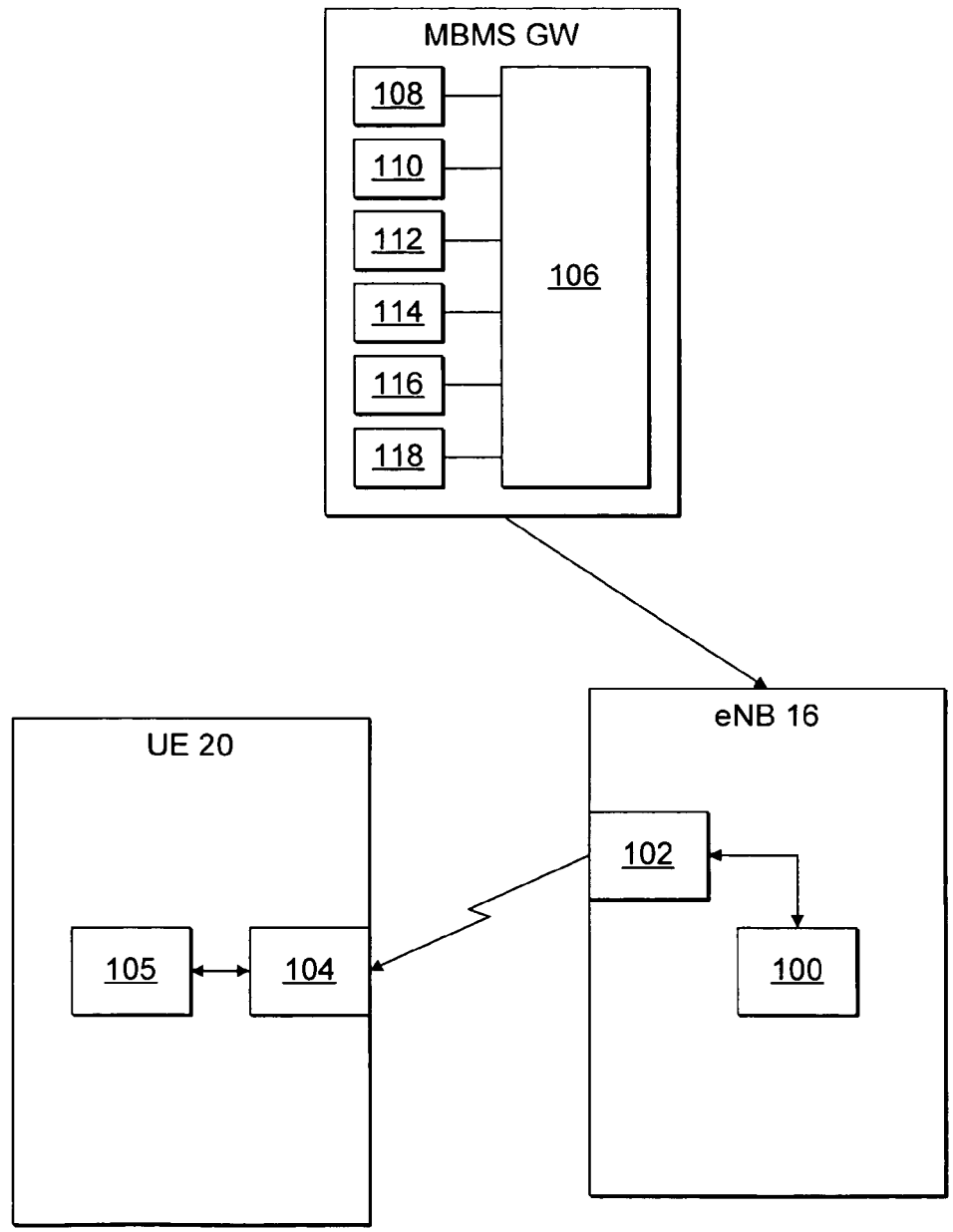
FIG. 14 shows schematically an architecture embodying the present invention.

All offered data belonging to said service multiplex may be sent to participating eNBs. The eNBs contain as shown in FIG. 14 a processor 100 to process and schedule the data based on pre-configured rules and a semi-statically configured radio resource allocation, into which the service multiplex must be fitted. The eNBs will decide which data will be transmitted based on the configured information. This is done by the processor 100 or another entity or functionality. The eNBs 16 will also signal the scheduling of each service in the multiplex to the UEs 20 so that they only need to receive data for the MBMS service, which they are interested in. The processor will provide this information to the radio transceiver 102 which transmits this information which is received by the transceiver 104 of the UE 20.

If scheduling information is transmitted over the air interface as MBSFN transmission, requiring it to be bit-exactly the same from every eNB, the eNBs should have correct knowledge of the total amount of packets and data from each service in a service multiplex. The probability of correct transmission of the amount of data and amount of packets per multiplexed MBMS Service on the M1_u interface may be improved by repeating the total octet- and packet counters per scheduling period and per service one or more times after all the data for the service has been forwarded as a part of the SYNC protocol. This is to ensure that the scheduling message from all eNBs become identical even if the eNBs do not all receive complete service data.

The granularity of semi-static scheduling can be defined either only in time or in time and frequency blocks of suitable size. In current E-UTRAN specifications frequency multiplexing is possible only among MBSFN-transmitted services destined to the same MBSFN Area. Thus in embodiments of the invention proposed to be used with the E-UTRAN as currently specified, it may be that only dynamic scheduling is applicable for frequency multiplexing MBSFN-transmitted services. In this scenario semi-static frequency multiplexing between services may not be necessary although semi-static frequency multiplexing may have applications in alternative embodiments of the invention. A system embodying the present invention may support both semi-static and dynamic allocations. Semi-static borders separate at least the group of single-cell services, and each different MBSFN Area. Dynamic allocations are preferably only possible between services of a service multiplex, all of which must be broadcast over the same MBSFN Area The scheduling between semi-static blocks may be accomplished by the centralized entity such as the MBMS gateway: A separable stream of IP-packets with header information is formed for each of these semi-static areas. If the data for a semi-statically allocated resource does not completely use the resource, the remaining allocation (complete transmission time intervals (TTIs)) can be used for unicast services on a mixed MBMS carrier (subject to the availability of suitable unicast data).

Figure 6:
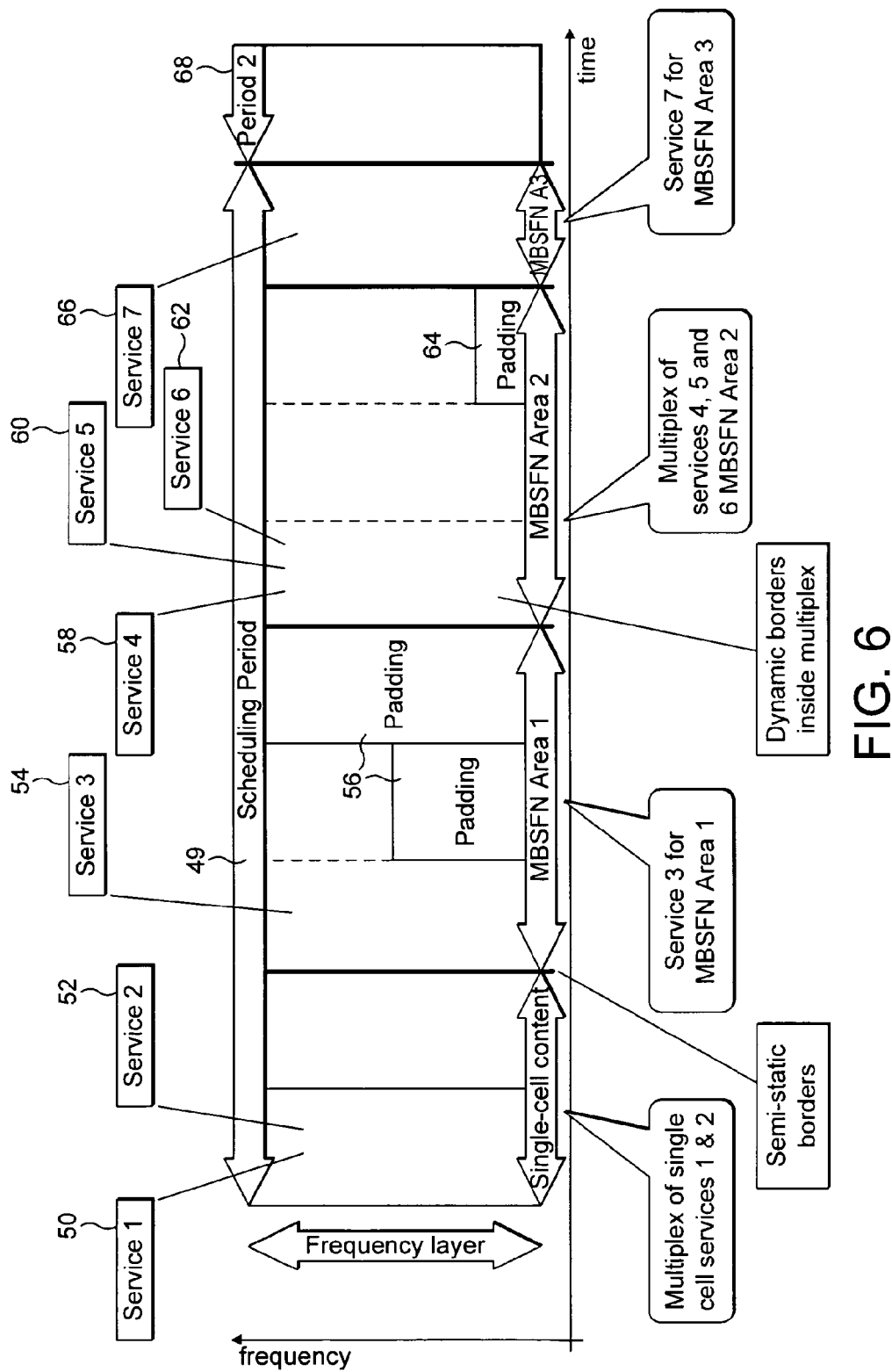
FIG. 6 shows an example of multiplexing and scheduling configuration on a dedicated MBMS frequency layer.

A simplified example configuration for a dedicated MBMS frequency layer is depicted in FIG. 6 which shows a first scheduling period 49. Services 1 and 2, denoted by reference number 50 and 52 respectively, are destined to a single cell and can be dynamically multiplexed, but as their scheduling could also be handled completely locally in the eNB, no SYNC protocol is required.

Service 3, denoted by reference number 54, has MBSFN area 1 dedicated to it, and therefore is not dynamically multiplexed with any other services. If the instantaneous data rate is lower than the semi-statically reserved capacity, padding 56 is inserted.

Services 4, 5 and 6, reference 58, 60 and 62 respectively, are sent to the same MBSFN Area and can therefore be dynamically multiplexed as proposed by embodiments of the present invention. If the total offered amount of data does not fill the allocated capacity, padding 64 is inserted.

Service 7, referenced 66, again targets a dedicated MBSFN Area and is not dynamically multiplexed. After the last service of the scheduling period 49, a new scheduling period 68 starts.

Figure 7:
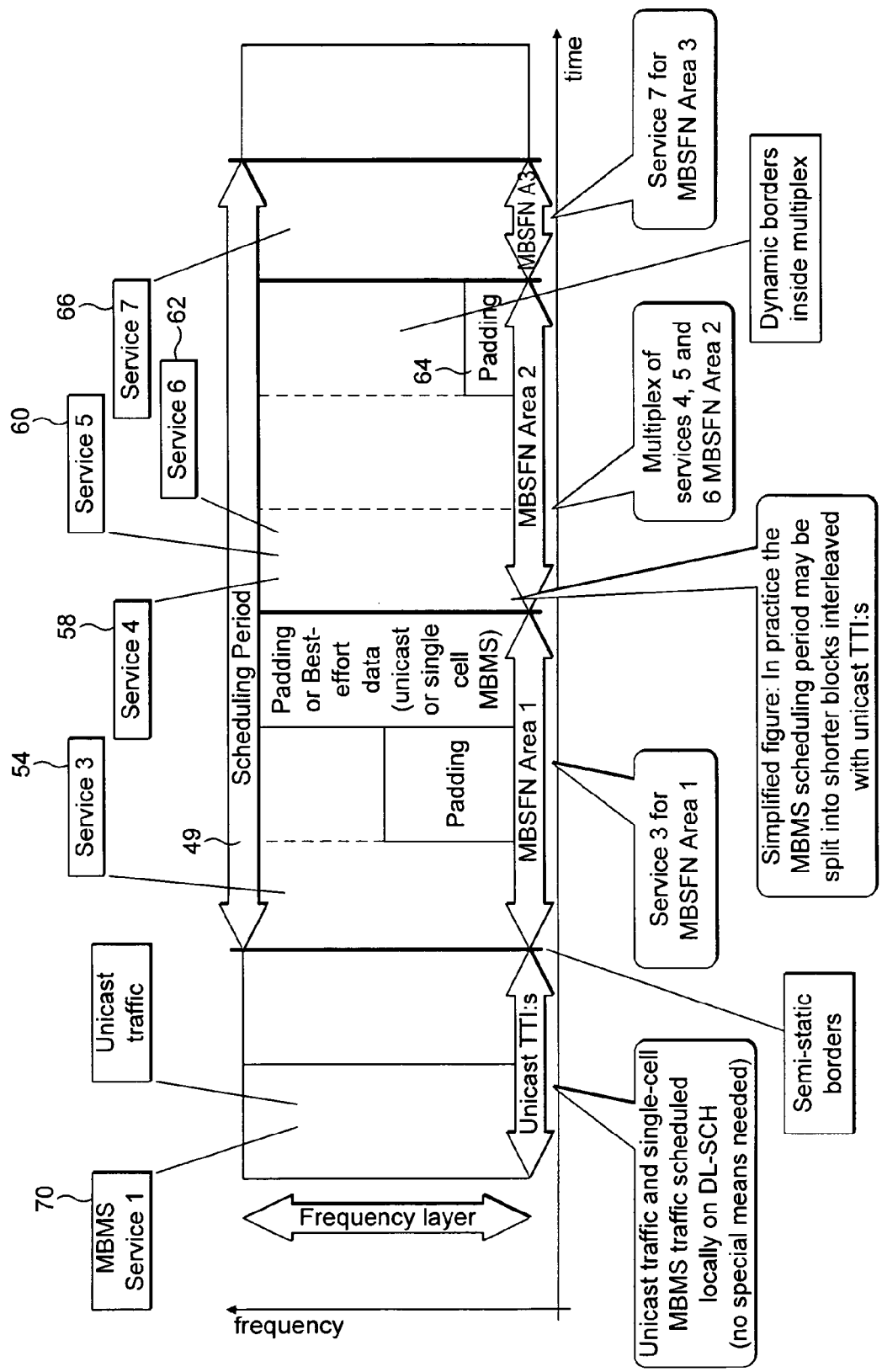
FIG. 7 shows an example of multiplexing and scheduling on a mixed unicast/MBMS frequency layer.

A corresponding image for a mixed frequency layer, where both unicast and MBMS traffic can be provided, is shown in FIG. 7. Now the single-cell TTIs are actually unicast TTIs, where single-cell MBMS traffic can be sent on the DL-SCH (Downlink Shared Channel as opposed to Multicast Channel (MCH), which is used for MBSFN transmissions). The multiplexing between unicast services and single-cell MBMS services can be completely dynamic without a centralized SYNC-protocol Another difference to the dedicated carrier case is that now unicast-data (if available) can utilize the unused capacity of service 3, since a complete TTI has been left unused. In other words instead of inserting padding, the time may be used to insert another (single-cell) service. This is because the length of time available is long enough for it to be used for a unicast service. It should be appreciated that in some embodiments of the invention, padding will be retained.

Thus MBMS service 1 is sent as unicast traffic on the DL-SCH. In other words if a MBMS service is intended for only one or some of the MBSFN cells, then the service can be sent on a DL-SCH. As can be seen from FIG. 7, services 3 to 7 are generally as described in relation to FIG. 6, except as described above.

For the service multiplex (for example services 4, 5 and 6 in the embodiment described in relation to FIGS. 6 and 7) all the offered data of each service is sent to the participating eNBs—even if the total aggregate amount of data may exceed the semi-static allocation of the service multiplex. The octet counter and packet counter fields are computed at least over the whole service multiplex. This is done by the processor 106 in the MBMS GW using the octet counter 108 and the packet counter 110. These counters may be hardware or software counters. In some embodiments of the invention, a plurality of different counters may be provided to deal with different frequencies, different MBSFN areas or the like.

In alternative implementations, corresponding octet and packet counters 112 and 114 in the MBMS over each individual service may also be calculated and signalled as a part of the SYNC protocol.

Additionally, the eNB must be able to differentiate between the services in the service multiplex and link together all the packets belonging to it—possible ways to signal this are e.g. the SYNC protocol, or an M1-u interface PDU header. One possible method for connecting the packets of the service multiplex would be to insert the "timestamp" information to all packets, provided by time stamp functionality 116 in the MBMS GW, another would be to set up a separate "multiplex ID" provided by multiplex ID 118 functionality in the MBMS. As examples, the "timestamp" could be the "System Frame Number" (SFN), in which the first packet of the service multiplex is to be transmitted, or an absolute time reference to GPS (Global Positioning System) clock timing.

Figure 8:
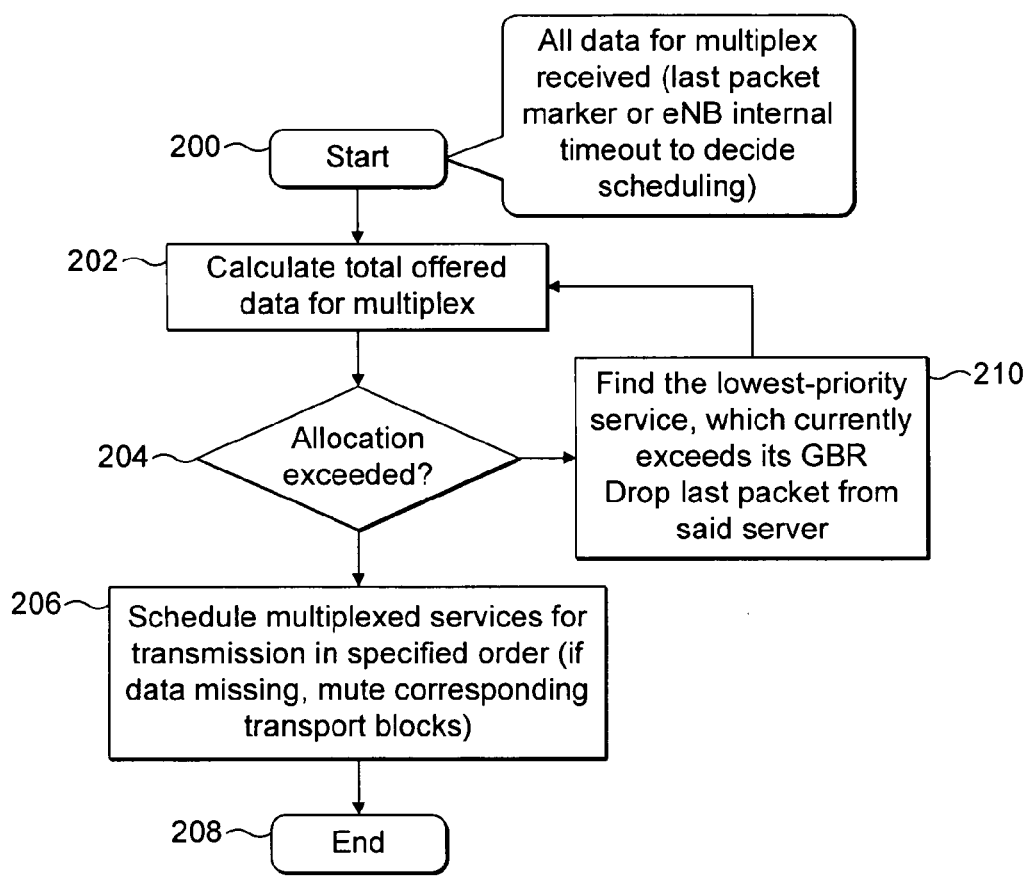
FIG. 8 shows a flowchart of dynamic service multiplexing scheduling in which the Guaranteed Bit Rate GBR of each service is taken into account.

All eNB should follow a pre-determined algorithm to determine resource sharing between the services of the service multiplex. An example of such an algorithm is described in FIG. 8 which shows a flow chart of dynamic service multiplexing scheduling example respecting GBR of each service In the example algorithm:

1) Start the algorithm (referenced 200) after all data for the multiplex is received (either packet with last packet indicator received, or an eNB internal timeout to perform scheduling expires).
2) Compute the total offered data for the multiplex (referenced 202).
3) Determine if the total offered data exceeds the available semi-static capacity for the multiplex (referenced 204).
4) If the total offered data does not exceed the available semi-static capacity for the multiplex, transmit as is. This means that the multiplexed services are scheduled for transmission in the specified order. If data is missing, then the corresponding transport blocks are muted (referenced 206)
5) The algorithm is then ended (referenced 208)
6) If the total offered data exceeds the available semi-static capacity for the multiplex find the lowest-priority service, which currently exceeds its guaranteed bitrate and remove the last packet from said service (referenced 210) and return to 2). In the case where there are two or more services which have the same priority, the packet will be dropped from the specified service. This could be for example the first or last in the designate transmission order.

In this way all the services are guaranteed to get capacity up to their guaranteed bitrates, if they need it. If some services do not require capacity up to the GBR, the extra capacity becomes available to other services of the multiplex.

In one modification to the above described algorithm, in point 6) the algorithm uses the available capacity to determine the number of packets which need to be dropped so that this will be followed by the transmission of the data. The algorithm may use various rules to determine which packet or packets are to be dropped taking into account the priority of the service and the number of packet which are to be dropped. Thus for example if two packets are to be dropped, both may come from the lowest priority service or one could come from each of the two lowest priority services. The relative priority of the services and/or the absolute priority of the service may used in determining which packets are to be dropped.

This algorithm may be performed by processor 100 of an eNB at least partially or completely. In alternative embodiments of the invention, the algorithm may be carried out by other functionalities of the eNB.

To maintain the ability of eNBs to recover from packet losses on the M1_u interface (especially without providing service-specific elapsed packet and octet counters), services within the same service multiplex may be concatenated. In this case the header information advising the start of a new MBMS service is embedded in RLC-PDU structure. As the starting and ending points of an individual service would not respect transport block borders, UEs need to receive some data of the previous or next service to collect all data. As a benefit of this approach, eNB recovery after data loss on M1_u interface may be guaranteed the same way as in the case of sending just one service with semi-static allocation.

Figure 9:
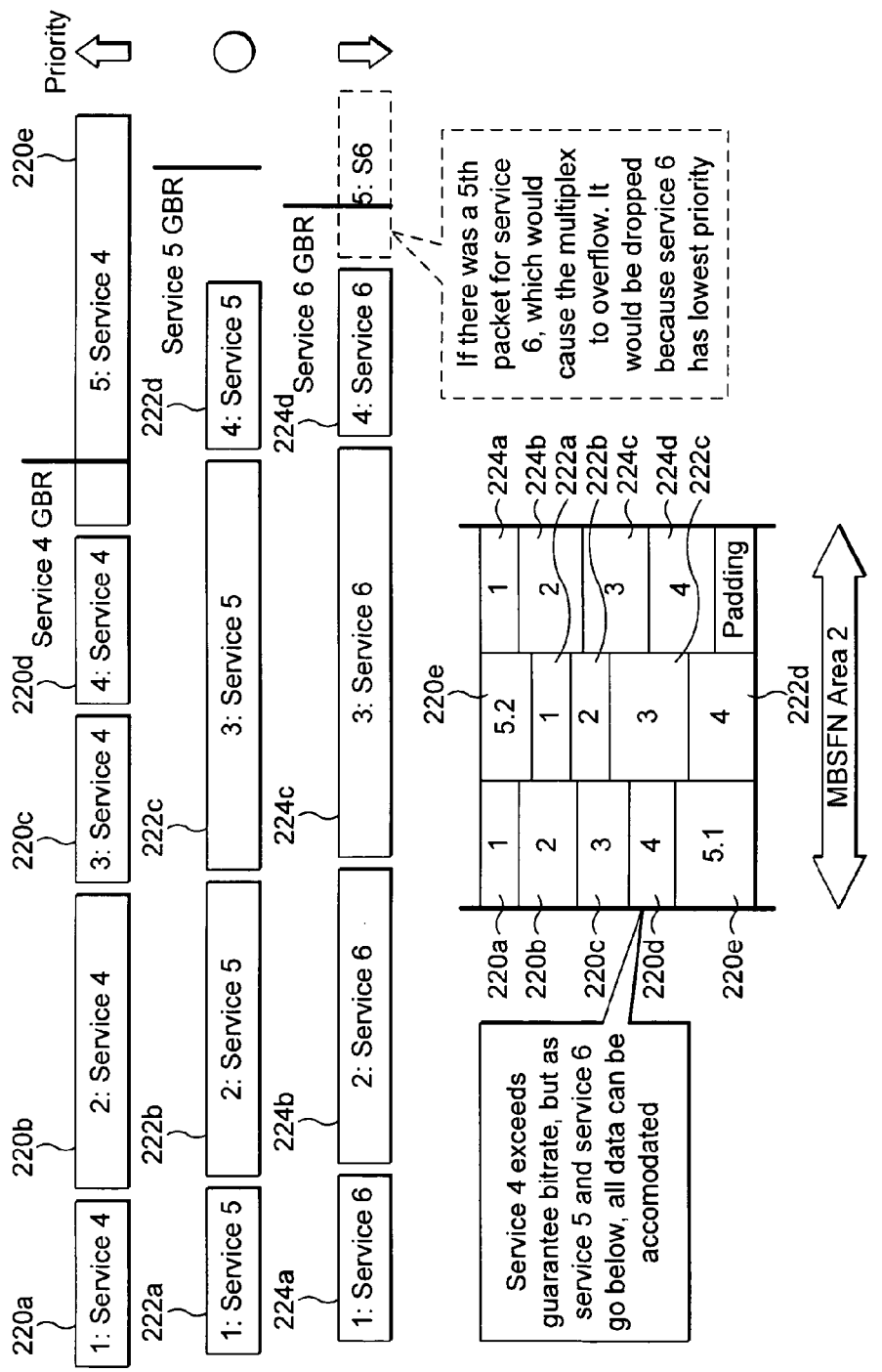
FIG. 9 shows an example of service multiplexing within a dynamic multiplexing environment.

An example of data scheduling within a dynamic multiplex by an eNB is illustrated in FIG. 9. Service 4 with data 220a-e, has high priority, service 5 with data 222a-d has medium priority and service 6 with data 224a-d has low priority. The transmission order of services is configured to eNB in numbered order (4, 5, 6). From the beginning of the first semi-statically allocated TTI, services 4, 5 and 6 are segmented and concatenated into the available space. Service 4 exceeds its GBR in this scheduling period. Services 5 and 6 offer data below GBR, and everything can be accommodated with some padding. In the dotted line alternative example service 6 would have offered one more packet, causing the amount of data for the multiplex to overflow. As service 6 has lowest priority among the three dynamically multiplexed services, the last packet of service 6 would in this case be dropped.

An example of a MAC and RLC PDU structure used in embodiments of the invention is described next. It should be appreciated that the following PDU structure is one way in which an embodiment of the invention can be implemented. Alternative embodiments of the invention can be implemented on the RLC level in a number of different ways.

Figure 10:
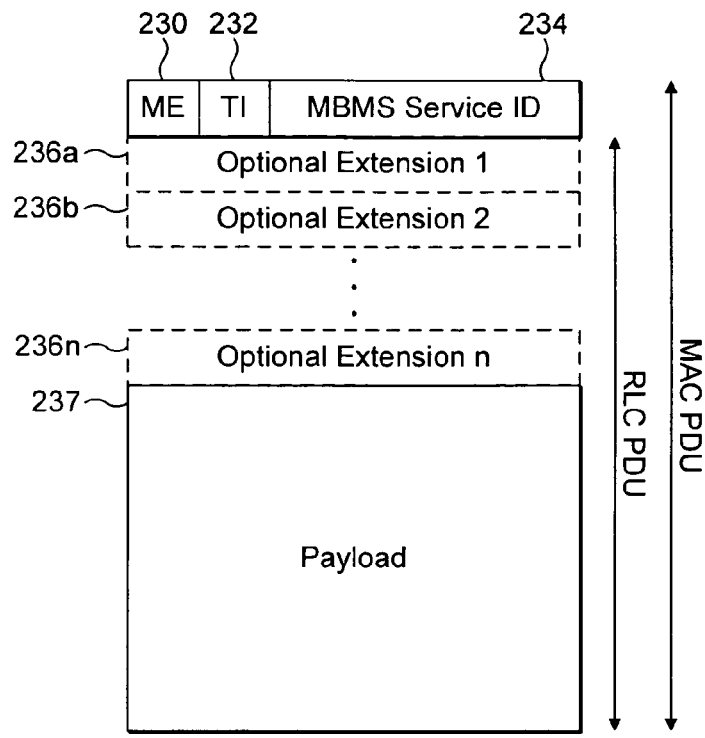
FIG. 10 shows a High-Level MAC (Medium Access Control) and RLC (Radio Link Control) PDU (Protocol Data Unit) structure used in embodiments of the invention.
Figure 11:
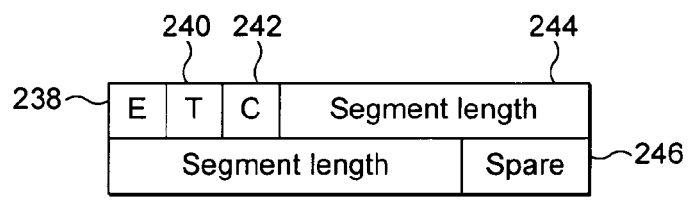
FIG. 11 show a Length Indicator optional extension.
Figure 12:
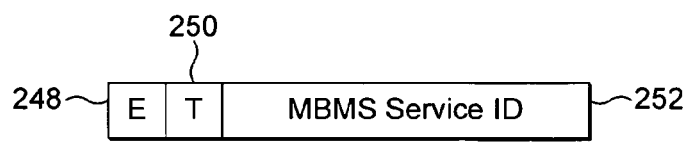
FIG. 12 shows a MBMS Service ID (Identifier) option extension.

The formulation of the packet with this structure is done in the eNB and may be carried out by the processor 100. The high-level structure of the PDU is shown in FIG. 10. The abbreviations used for the various information fields and octets are listed below. The data is arranged in the PDU in the order of the fields set out below ME=MAC extension flag (referenced 230). If the ME flag is set, an optional RLC header extension follows, examples of which are shown in FIGS. 11 and 12.

TI=Tail Indicator Flag (referenced 232). The TI flag covers the case, where the last SDU exactly fills the complete PDU. This flag is set every time, when the SDU exactly ends in the end of the PDU. The following PDU starts with a dummy segment length indicator (zero-length segment) to produce the required exactly one length indicator per SDU to remain in sync.

MBMS Service ID=Identifier for MBMS Service (referenced 234). The MBMS Service ID in FIG. 10 identifies the first MBMS service, which has data in the PDU.

This is followed by optional extension fields 1 to n (reference 236a-n). In other words there may be none, one or more optional extension fields. Examples of optional extension fields are shown in FIGS. 11 and 12. The Optional Extension field, of which there can be zero or more, can be one of two types: Length Indicator (FIG. 11) or a new MBMS Service ID (FIG. 12). The optional extension of FIG. 11 is the length indicator optional extension and comprises:

E=RLC extension flag (referenced 238)

C=Continuation flag (referenced 240). If there is padding after the last SDU, C=0. If C=1 it means, that another SDU starts and continues until the end of the RLC-PDU.

T=Type flag (referenced 242)

Segment length 11 bits (enough for 2048 octets payload; current assumption 1444 max Transport Block size)—(referenced 244). A Length indicator is inserted whenever an SDU ends within the current RLC-PDU.

There are some spare bits (referenced 246)

The MBMS service ID extension comprises the following fields:

E=RLC extension flag (referenced 248)

T=Type flag (referenced 250)

A MBMS service ID field (referenced 252). A new MBMS Service ID is inserted, when a new MBMS Service starts within the current RLC-PDU.

If E=1 in one of the optional extension fields, this means that there is another optional extension following. If E is not equal to one, this indicates that this is the last optional extension.

The T-flag signals, whether the present header extension is a segment length field (T=0) or a new MBMS Service ID (T=1, in case the service changes in the current RLC-PDU).

This is then followed by the payload 237.

Figure 13:
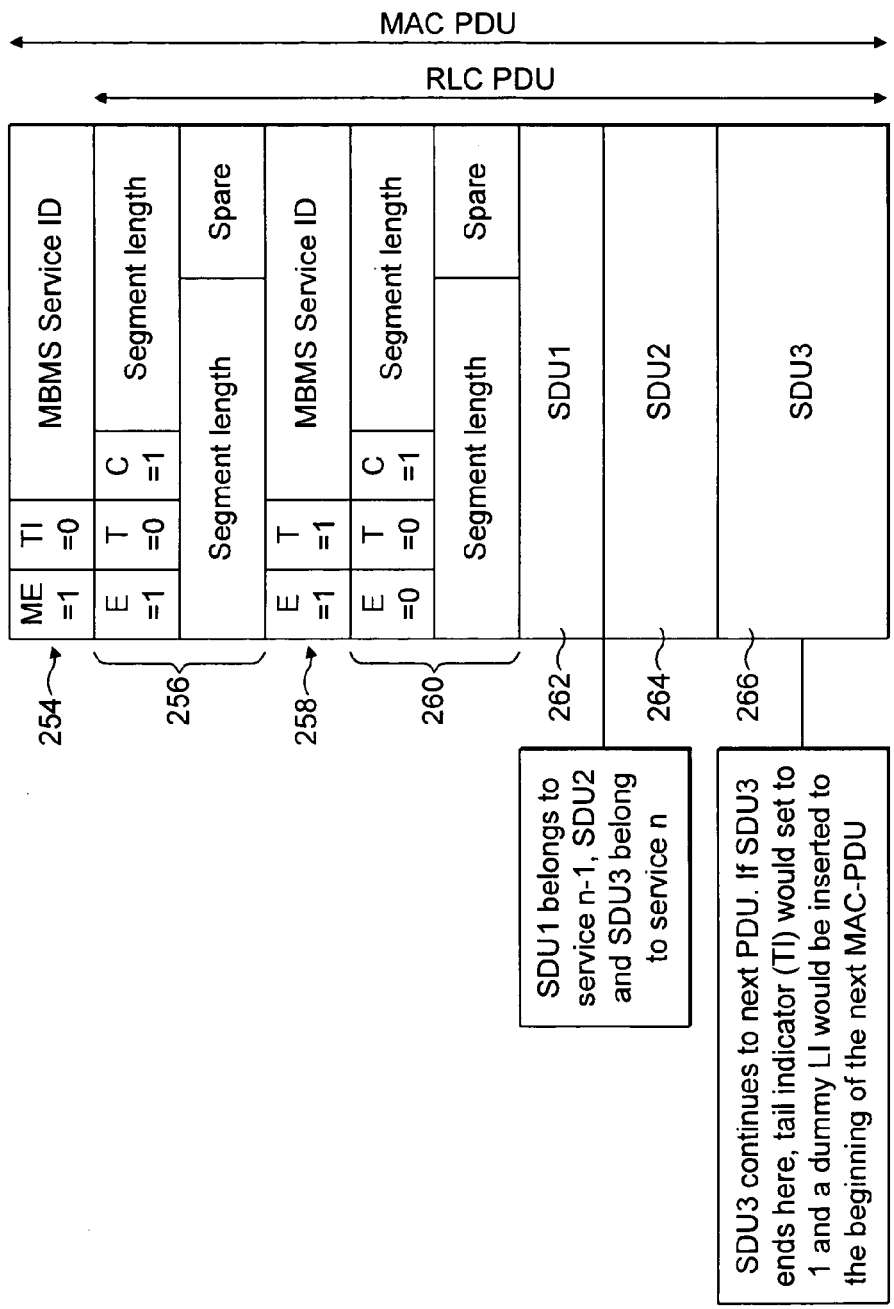
FIG. 13 shows an example of a MAC- and RLC-PDU.

An example of a case, where a first service has the remainder of one SDU (SDU1) in a MAC-PDU, and second service continues with one complete SDU and the first fragment of a second SDU, is shown FIG. 13. There is a first MBMS service ID 254 (as in the first line of FIG. 10) for the first service followed by a first length indicator extension 256 for the first service. This is followed by a first MBMS service ID optional extension 258 followed by a second length indicator optional extension 260 for the second service. This is followed by SDU1 262 for service 1, and SDU2 264 and SDU 3 266 belonging to service 2. SDU 3 continues to the next PDU. If SDU3 ends here, the tail indicator TI would be set to 1 and a dummy LI length indicator would be inserted at the beginning of the next MAC-PDU.

If the scheduling information is transmitted to UEs as MBSFN transmission, requiring it to be bit-exactly the same from every eNB, the probability of correct reception of the amount of data and amount of packets per multiplexed MBMS Service on the M1_u interface should be improved for the participating eNBs, because if an eNB loses some data packets, it may be ambiguous, how to formulate the scheduling information to the UEs, who should begin reception at a certain point in time. An option is to repeat total octet- and packet counters per service one or more times after all the data for the service has been forwarded as a part of the SYNC protocol.

The embodiment described above builds upon the assumption that the MBMS GW node can construct the elapsed packet and elapsed octet counters of the multiplexed services in correct sequence, one service after another (the packets may arrive to eNBs in any order, as long as the SYNC header information forms the correct sequence). To accomplish this, the GW may also need to buffer the whole scheduling period before data can be forwarded.

It should be appreciated that in embodiments of the invention, the SYNC header information is provided by the MBMS GW 10 to the eNBs 16

An alternative embodiment to that of buffering of data in MBMS GW to achieve correctly sequenced SYNC header information is possible:

Elapsed packet and elapsed octet counters are calculated both over the service multiplex and over each individual service. All of this information is communicated to participating eNBs over the SYNC protocol by the MBMS GW 10.

Now the eNBs would have adequate information to re-arrange the packets for transmission, even if they are transmitted as scattered from the MBMS GW. This may be performed by processor 100 which passes the packets to the transmitter 102 for transmission to the UE 20.

The elapsed packet counter is used to count the number of packets. Starting from e.g. zero, the elapsed packet counter is incremented for the header of each new packet, so the value of elapsed packet counter in second packet would be 1, in the third packet 2 and so on. In different embodiments the elapsed packet counter may or may not be reset in the beginning of a new scheduling period. Alternatively there can be a maximum value, after which counting re-starts from zero.

The elapsed octet counter is used to calculate the amount of data in packets, which have been transmitted. Starting from zero, the elapsed octet counter of the second packet will be set to the length of the first packet in octets (=elapsed number of octets). The length of the second packet in octets will be added to the elapsed octet counter so that the elapsed octet counter of the third packet will contain the combined length of the first and second packet.

In some embodiments of the invention, the term byte counter may be used instead of octet counter.

Together with the added security option of repeating octet- and packet counters per service described above, this alternative embodiment would enable another favourable option: The services of the service multiplex could also start only at determined points (border of addressable transport blocks), with some padding between the services. As a benefit, the scheduling information given to the UEs could point exactly to the start of each service. Thus the UE receives scheduling information from the eNB. This scheduling information is received by receiver 104 and passed to processor 105. The processor uses the scheduling information to control when the receiver receives the information. In the alternative, the information can be used by the processor 105 to speed up the processing of the received services. Also the header structure could follow exactly the same model for both semi-statically scheduled services and the dynamically scheduled services within a service multiplex, i.e. the MBMS Service ID in the optional part of the RLC-PDU header might not required.

It should be appreciated that the UE 20 will receive the same service transmitted by a plurality of the eNBs. The UE can use any suitable strategy for dealing with these multiple transmissions such as combining two or more transmissions, selecting the strongest transmission and so on.

Various embodiments are defined in the table below. It should be appreciated that each of these options comprises an embodiment of the invention. However, these are by way of example and alternative implementations of the present invention may be provided.

| Alt: | MBMS GW Ordering | UE Scheduling Info (MCCH) | Concatenation of services in multiplex | SYNC + M1_u info | MAC- and RLC-PDU | Description |
|---|---|---|---|---|---|---|
| 1 | Yes | Single-cell | Yes | Timestamp (Implicit MBMS Multiplex ID) MBMS Service ID Elapsed packet over multiplex Elapsed octet over multiplex Last packet flag | Optional MBMS Service ID element used in RLC-PDU | Simple option, but requires buffering in MBMS GW, may not get MBSFN gain for control signalling. Concatenating as much as possible |
| 2 | No | Single-cell | Yes | Timestamp (Implicit MBMS Multiplex ID) MBMS Service ID Elapsed packet over multiplex Elapsed octet over multiplex Elapsed packet over service Elapsed octet over service Last packet flag | Optional MBMS Service ID element used in RLC-PDU | No re-order buffering necessary in MBMS GW, but may not get MBSFN gain for control signalling. Concatenating as much as possible |
| 3 | No | MBSFN | Yes | Timestamp (Implicit MBMS Multiplex ID) MBMS Service ID Elapsed packet over multiplex Elapsed octet over multiplex Elapsed | Optional MBMS Service ID element used in RLC-PDU | No re-order buffering necessary in MBMS GW, can get MBSFN gain for control signalling, while concatenating as much as possible |

-continued

| Alt: | MBMS GW Ordering | UE Scheduling Info (MCCH) | Concatenation of services in multiplex | SYNC + M1_u info | MAC- and RLC-PDU | Description |
|---|---|---|---|---|---|---|
| | | | | packet over service Elapsed octet over service Last packet flag Separate (possibly repeated) messages to send Total packet over service Total octet over service | | |
| 4 | No | MBSFN | No | Timestamp (Implicit MBMS Multiplex ID) MBMS Service ID Elapsed packet over multiplex Elapsed octet over multiplex Elapsed packet over service Elapsed octet over service Last packet flag Separate (possibly repeated) messages to send Total packet over service Total octet over service | No optional MBMS Service ID element | No re-order buffering necessary in MBMS GW, MBSFN gain for control signalling, can schedule UE reception to exact start/ end positions of a given service with some increase in total amount of padding. |
| 5 | Yes | MBSFN | Yes | Timestamp (Implicit MBMS Multiplex ID) MBMS Service ID Elapsed packet over multiplex Elapsed octet over multiplex Last packet flag Separate (possibly repeated) messages to send Total packet over service Total octet over service | Optional MBMS Service ID element used in RLC-PDU | Re-order buffering in MBMS GW, MBSFN gain for control signalling, concatenating as much as possible. |
| 6 | Yes | MBSFN | No | Timestamp (Implicit MBMS Multiplex ID) MBMS Service ID Elapsed packet over multiplex Elapsed octet over multiplex Last packet flag | No optional MBMS Service ID element | Re-order buffering in MBMS GW, MBSFN gain for control signalling, can schedule UE reception to exact start/ end positions of a given service with some |

-continued

| Alt: | MBMS GW Ordering | UE Scheduling Info (MCCH) | Concatenation of services in multiplex | SYNC + M1_u info | MAC- and RLC-PDU | Description |
|---|---|---|---|---|---|---|
| | | | | Separate (possibly repeated) messages to send Total packet over service Total octet over service | | increase in total amount of padding. |

The SYNC information can thus be transferred form the MBMS GW 10 to the eNBs in a SYNC header, a SYNC packet or with the MBMS service or services.

The SYNC information can include one or more of the following information:
- time stamp information (in some systems this is provided explicitly whilst in other systems this information may be implicitly implied by the timing of the SYNC information itself.
- MBMS multiplex ID (in some systems this is explicitly defined whilst in other systems this is implicitly defined.
- MBMS Service ID
- Elapsed packet over multiplex—that is a counter for packets of all multiplexed services which have been sent, incremented by one for each new packet.
- Elapsed octet over multiplex—that is a counter for the combined total number of octets which have been sent over all the multiplexed services, incremented by the length of the previous packet in octets (sets of 8 bits) for each new packet
- Last packet flag (if the packet was the last packet).
- Elapsed packet over service—that is a counter for packets of the current service, incremented by one for each new packet.
- Elapsed octet over service—that is a counter for the number of octets of the current service, incremented by the length of the previous packet in octets for each new packet.
- Total packet over service—that is the total number of packets for a given service.
- Total octet over service—that is the total number of octets for a given service.

It should be appreciated that in embodiments of the invention, where more than one piece of SYNC information is provided, this information can be provided together or can be provided in different locations such as in different header and packets.

Figure 15:
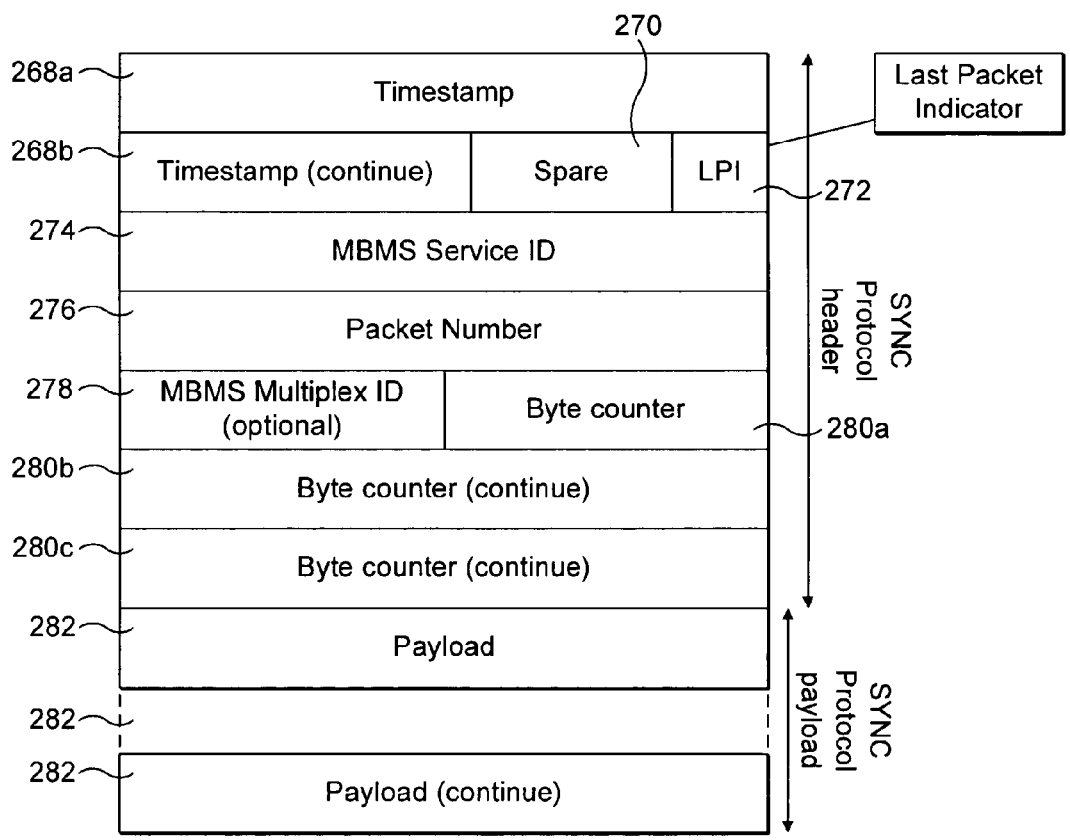
FIG. 15 shows an example of a SYNC protocol header structure.

FIG. 15 shows one example of a SYNC protocol header structure. The timestamp format is the SFN. This is just one example of a time stamp format. This is referenced 268 and is shown as being in a first part 268a and a second part 268b.

This is followed by some spare bits referenced 270.

This is followed by a LPI—last packet indicator 272 which will be set if the packet is a last packet.

This is followed by the MBMS service ID 274 and a packet number 274. The packet counter is 8 bits in this example meaning 255 packets per service per scheduling period is a maximum.

This is followed by the MBMS multiplex ID 278 which is optional depending on the embodiment of the invention—see the above table. Multiplex ID is not necessarily needed because when eNB and GW knows which services are multiplexed, Service ID is enough in the protocol. Therefore the Multiplex ID is marked as "(optional)". This has in this example four bits meaning 16 multiplexes are possible.

This is followed by a byte counter 280a-c. In this example the counter is 20 bits meaning about 1 MBytes per scheduling period is a maximum.

This is then followed by payload.

Embodiments of the invention may provide a variable bitrate, guaranteed per service, which can be supported in a distributed architecture. In some embodiments of the invention, the capacity to buffer over a scheduling period is used needed in all participating eNBs.

The arrangement of FIG. 14 represents schematically embodiments of the present invention. It should be appreciated that one or more of the functionalities or parts described and/or shown may be implemented by a computer program. Accordingly embodiments of the present invention extend to a computer program comprising computer executable portions which may be executed when run on a computer or microprocessor or the like. Alternatively or additionally it should be appreciated that the arrangement shown in FIG. 14 is schematic and a given entity may provide the function of one or more of the entities shown in FIG. 14.

As discussed, the above described operations may require data processing in the various entities. The data processing may be provided by means of one or more data processors. Appropriate computer program code product may be used for implementing the embodiments when loaded to a computer. The program code product for providing the operation may be stored on and provided by with appropriate software in a server.

In this document, the term eNB has been used. It should be appreciated that embodiments of the present invention may be implemented with any other type of base station. It should be appreciated that eNB is a base station as proposed in the LTE proposals.

MBMS services can be any suitable service. By way of example, television or radio broadcasts may be provided as MBMS services. It should be appreciated that embodiments of the invention may have application with services other than MBMS services. It should be appreciated that embodiments of the invention may be used in contexts other than the LTE context of the above described embodiments.

The user equipment can be any suitable form of user equipment such as a mobile station, mobile telephone, personal organiser, PDA (personal digital assistant), computer, portable computer, notebook, service receiver, MBMS service receiver, television receiver, radio receiver or the like.

It is noted that while the above describes exemplifying embodiments of the invention, there are several variations and modifications which may be made to the disclosed solution without departing from the scope of the present invention or inventions as defined in the appended claims.

What is claimed is:

1. A method comprising;
receiving data at one of a plurality of nodes including synchronization information relating to a plurality of services to be broadcast by said plurality of nodes over a common area; and
determining at said one of said plurality of nodes dependent on the synchronization information which data of the plurality of services is to be transmitted by said one of said plurality of nodes so that a transmission of the plurality of services by said one of said plurality of nodes is synchronized with the broadcast by said plurality of nodes of the plurality of services over the common area, wherein the synchronization information includes information relating to a quantity of data of each of said plurality of services individually to said plurality of nodes, wherein the information relating to the quantity of data is used by said one of said plurality of nodes to synchronize the transmission of the plurality of services with the broadcast by said plurality of nodes of the plurality of services over the common area.

2. The method according to claim 1, further comprising multiplexing said plurality of services.

3. The method according to claim 1, wherein said services comprise multimedia Broadcast/multicast services.

4. The method according to claim 1, wherein each service is provided by a separate bearer.

5. The method according to claim 1, wherein said common area is defined by an area comprising a plurality of cells associated with respective nodes.

6. The method according to claim 5, wherein each of said nodes comprises a base station.

7. The method according to claim 1, comprising receiving information identifying at least one of transmission order of said services, priority information of said services, and guaranteed bit rate information associated with each of said services.

8. The method according to claim 7, comprising transmitting said information to each node associated with said common area.

9. A method comprising:
receiving data including synchronization information relating to a plurality of services to be broadcast over a common area by a plurality of nodes; and
providing information in relation to scheduling of said plurality of services to at least one receiving node so that a reception of the plurality of services by said at least one receiving node is synchronized dependent on the synchronization information with the broadcast by said plurality of nodes of the plurality of services over the common area, wherein the synchronization information includes information relating to a quantity of data of each of said plurality of services, wherein the information relating to the quantity of data is used by one of said plurality of nodes to synchronize a transmission of the plurality of services with the broadcast by said plurality of nodes of the plurality of services over the common area.

10. The method according to claim 9, comprising using said scheduling information at said at least one receiving node to allow said receiving node to schedule reception time for a desired one of said services.

11. An apparatus comprising:
at least one memory encoded with computer program code which when executed by a processor, causes the apparatus to;
receive data at one of a plurality of nodes including synchronization information relating to a plurality of services to be broadcast by said plurality of nodes over a common area, wherein the synchronization information includes information relating to a quantity of data of each of said plurality of services individually to said plurality of nodes, wherein the information relating to the quantity of data is used by said one of said plurality of nodes to synchronize a transmission of the plurality of services with the broadcast by said plurality of nodes of the plurality of services over the common area; and
determine at said one of said plurality of nodes dependent on the synchronization information which data of the plurality of services is to be transmitted by said one of said plurality of nodes so that the transmission of the plurality of services by said one of said plurality of nodes is synchronized with the broadcast by said plurality of nodes of the plurality of services over the common area.

12. The apparatus according to claim 11, further comprising multiplexing said plurality of services.

13. The apparatus according to claim 11, further comprising receiving information identifying at least one of transmission order of said services, priority information of said services, and guaranteed bit rate information associated with each of said services.

14. An apparatus comprising:
at least one memory encoded with computer program code which when executed by a processor, causes the apparatus to;
receive data including synchronization information relating to a plurality of services to be broadcast over a common area by a plurality of nodes, wherein the synchronization information includes information relating to a quantity of data of each of said plurality of services individually to said plurality of nodes, wherein the information relating to the quantity of data is used by one of said plurality of nodes to synchronize a transmission of the plurality of services with the broadcast by said plurality of nodes of the plurality of services over the common area; and
provide information in relation to scheduling of said plurality of services to at least one receiving node so that a reception of the plurality of services by said at least one receiving node is synchronized dependent on the synchronization information with the broadcast by said plurality of nodes of the plurality of services over the common area.

15. A method comprising;
receiving at least one of a plurality of services broadcasted from a plurality of nodes, wherein the plurality of nodes each receives data including synchronization information relating to said plurality of services to be broadcast by said plurality of nodes over a common area, wherein information relating to a quantity of data of each of said plurality of services individually is received by said plurality of nodes, wherein the information relating to the quantity of data is used to synchronize the broadcast by said plurality of nodes of the plurality of services over the common area, and at least one of said plurality of nodes uses the data relating to said plurality of services so that transmission of the plurality of services by said at least one of said plurality of nodes is synchronized dependent on the synchronization information with the broadcast by said plurality of nodes of the plurality of services over the common area.

16. The method according to claim 15, wherein said plurality of services is multiplexed.

17. The method according to claim 15, wherein said plurality of services comprise multimedia Broadcast/multicast services.

18. The method according to claim 15, wherein each service of said plurality of services is provided by a separate bearer.

19. The method according to claim 15, wherein said common area is defined by an area comprising a plurality of cells associated with respective nodes.

20. An apparatus, comprising: memory encoded with computer program code which when executed by a processor, causes the apparatus to perform at least the following:
receive at least one of a plurality of services broadcasted from a plurality of nodes, wherein the plurality of nodes each receives data including synchronization information relating to said plurality of services to be broadcast by said plurality of nodes over a common area, wherein information relating to a quantity of data of each of said plurality of services individually is received by said plurality of nodes, wherein the information relating to the quantity of data is used by at least one of said plurality of nodes to synchronize a transmission of the plurality of services with the broadcast by said plurality of nodes of the plurality of services over the common area, and at least one of said plurality of nodes uses the data relating to said plurality of services so that transmission of the plurality of services by said one of said plurality of nodes is synchronized dependent on the synchronization information with the broadcast by said plurality of nodes of the plurality of services over the common area.

21. The apparatus according to claim 20, wherein said plurality of services is multiplexed.

22. The apparatus according to claim 20, wherein said plurality of services comprise multimedia Broadcast/multicast services.

23. The apparatus according to claim 20, wherein each service of said plurality of services is provided by a separate bearer.

24. The apparatus according to claim 20, wherein said common area is defined by an area comprising a plurality of cells associated with respective nodes.

25. The method according to claim 1, wherein which data of the plurality of services is to be transmitted is determined dependent on the received data so that the broadcasting over the common area of the plurality of services from said plurality of nodes is synchronized.

* * * * *